United States Patent
Smith et al.

(10) Patent No.: US 7,013,156 B2
(45) Date of Patent: Mar. 14, 2006

(54) VIRTUAL NETWORK SOLUTION FOR SMS MESSAGE EXCHANGE BETWEEN GSM AND ANSI (TIA/EIA 41) NETWORKS

(75) Inventors: Mark R. Smith, Warrenton, VA (US); Paul R. Ruppert, Rockville, MD (US); Robert C. Lovell, Jr., Leesburg, VA (US)

(73) Assignee: Mobile 365, Inc., Chantilly, VA (US)

( * ) Notice: Subject to any disclaimer, the term of this patent is extended or adjusted under 35 U.S.C. 154(b) by 0 days.

(21) Appl. No.: 10/796,043

(22) Filed: Mar. 10, 2004

(65) Prior Publication Data

US 2004/0180678 A1 Sep. 16, 2004

Related U.S. Application Data

(60) Provisional application No. 60/453,961, filed on Mar. 13, 2003.

(51) Int. Cl.
H04Q 7/20 (2006.01)
(52) U.S. Cl. .................................... 455/466; 455/552.1
(58) Field of Classification Search ................ 455/466, 455/412.1, 412.2, 417, 550.1, 432.2, 432.3, 455/433, 435.2, 445, 552.1; 709/206, 238; 370/352, 355, 401, 395, 328
See application file for complete search history.

(56) References Cited

U.S. PATENT DOCUMENTS

| | | | |
|---|---|---|---|
| 5,351,235 A | 9/1994 | Lahtinen | |
| 5,621,727 A | 4/1997 | Vaudreuil | |
| 5,768,509 A | 6/1998 | Gunluk | |
| 5,887,249 A | 3/1999 | Schmid | |
| 5,894,478 A | 4/1999 | Barzegar et al. | |
| 6,208,870 B1 | 3/2001 | Lorello et al. | |
| 6,230,009 B1 | 5/2001 | Holmes et al. | |
| 6,240,293 B1 | 5/2001 | Koster | |
| 6,327,267 B1 | 12/2001 | Valentine et al. | |
| 6,366,663 B1 | 4/2002 | Bauer et al. | |
| 6,421,437 B1 | 7/2002 | Slutsman | |
| 6,535,746 B1 | 3/2003 | Yu et al. | |
| 6,560,226 B1 | 5/2003 | Torrey et al. | |
| 6,594,254 B1 | 7/2003 | Kelly | |
| 6,658,260 B1 * | 12/2003 | Knotts | 455/466 |
| 6,738,630 B1 | 5/2004 | Ashmore | |

(Continued)

FOREIGN PATENT DOCUMENTS

EP  0 777 394 A1  12/1995

(Continued)

*Primary Examiner*—Jean Gelin
(74) *Attorney, Agent, or Firm*—Pillsbury Winthrop Shaw Pittman LLP

(57) ABSTRACT

Systems and methods for exchanging a short message service (SMS) message between networks operating in accordance with different standards. An intermediary system operates between a first network operating in accordance with a first standard and a second network operating in accordance with a second standard. A routing information request for an SMS message is received, at the intermediary, from the first network and the intermediary sends, in response to the routing information request, an acknowledgement message to the first network. The SMS message is thereafter received at the intermediary and an acknowledgement of receipt of the SMS message is generated in the intermediary and then sent to the first network. The SMS message is then sent from the intermediary to the second network. In a preferred embodiment, the intermediary is an entity distinct from the first and second networks, but operates as a virtual MSC from the perspective of the first and second networks.

8 Claims, 9 Drawing Sheets

U.S. PATENT DOCUMENTS

| | | |
|---|---|---|
| 6,772,267 B1 | 8/2004 | Thaler et al. |
| 2002/0015403 A1 | 2/2002 | McConnell et al. |
| 2002/0029189 A1 | 3/2002 | Titus et al. |
| 2002/0112014 A1 | 8/2002 | Bennett et al. |
| 2002/0167909 A1 | 11/2002 | Balazinski et al. |
| 2003/0003930 A1 | 1/2003 | Allison |
| 2003/0083078 A1 | 5/2003 | Allison et al. |
| 2003/0118027 A1 | 6/2003 | Lee et al. |
| 2003/0202521 A1 | 10/2003 | Havinis et al. |
| 2004/0032856 A1 | 2/2004 | Sandstrom |
| 2005/0119015 A1 * | 6/2005 | Linkola ............... 455/466 |
| 2005/0176445 A1 * | 8/2005 | Qu et al. ............... 455/458 |

FOREIGN PATENT DOCUMENTS

| | | |
|---|---|---|
| EP | 0 959 600 A1 | 4/1999 |
| WO | WO 97/36434 | 3/1996 |
| WO | WO 97/20442 | 11/1996 |
| WO | WO 99/11078 | 8/1998 |
| WO | WO 99/33226 | 12/1998 |
| WO | WO 00/41533 | 1/2000 |
| WO | WO 02/25875 A1 | 9/2001 |

* cited by examiner

VIRTUAL NETWORK SOLUTION FOR SMS MESSAGE EXCHANGE BETWEEN GSM AND ANSI (TIA/EIA 41) NETWORKS

This application claims the benefit of U.S. Provisional Application No. 60/453,961, filed Mar. 13, 2003, which is herein incorporated by reference in its entirety.

BACKGROUND

1. Field of the Invention

The present invention relates generally to telecommunications systems. More particularly, the present invention is related to systems and methods for exchanging messages between disparate networks operating in accordance with different standards.

2. Background of the Invention

The exchange of short message service (SMS) messages between distinct ITU GSM carriers has been supported by GSM standards almost since their inception. Specifically, GSM standards allow GSM PLMNs (Public Land Mobile Networks) to exchange (SMS) messages by way of roaming agreements. The technology permits one network element in a GSM PLMN to talk to other network elements in another GSM PLMN for the purpose of exchanging SMS messages. These messages are exchanged over what is called an SS7 or C7 network, which interconnects many mobile (and non-mobile) network elements.

In North American and many other countries, however, there are many mobile networks that implement ANSI mobile telephony standards such as TDMA and CDMA. Although core network elements belonging to these networks are interconnected by an SS7 network, it is not easily possible to interconnect TDMA-, CDMA- and GSM-based carriers via a common SS7 network, due to standards-specific reasons.

SMS messaging, a core component of the GSM standard, is also supported by TDMA and CDMA networks natively. However, due to inter-network connectivity issues and, in many instances, the of lack of roaming agreements between many of these networks, it is not presently possible to easily exchange messages between ITU GSM networks interconnected via a C7 (ITU SS7) network and ANSI TDMA and CDMA networks connected to ANSI SS7 networks.

Thus, there is a need to provide improved cross-network and cross-standards connectivity.

BRIEF SUMMARY OF THE INVENTION

The present invention provides improved connectivity by providing an Intermediary network solution whereby an Intermediary functions as a Virtual Carrier simulating many, if not all, of the necessary network element interfaces in each of the networks (GSM, TDMA, CDMA) to provide a sufficient framework for exchanging SMS messages among carriers operating in accordance with different standards. More specifically, a Virtual Network provider in accordance with the present invention functions as a Virtual GSM carrier on a C7 network and a Virtual ANSI network carrier (TDMA or CDMA) on an ANSI SS7 network, effectively bridging the networks to enable the sending and receiving of SMS messages. In one embodiment, the Intermediary functions as a Virtual carrier in one network and functions as a Relaying Intermediary for other networks for the purpose of exchanging SMS messages.

These and other features of the present invention, and their attendant advantages, will be more fully appreciated upon reading the following detailed description in conjunction with the accompanying drawings.

DETAILED DESCRIPTION OF THE INVENTION

The following acronyms are used in the following description and the associated drawings:

| | |
|---|---|
| AuC | Authentication Center |
| BSC | Base Station Controller |
| BSS | Base Station System |
| BTS | Base Transceiver Station |
| CdPA | Called Party Address |
| CgPA | Calling Party Address |
| DPC | Destination Point Code used for MTP addressing |
| EIR | Equipment Identity Register |
| GMSC | Gateway MSC |
| GTT | Global Title Translation |
| HLR | Home Location Register |
| IMSI | International Mobile Subscriber Identity |
| IWMSC | Interworking Mobile Switching Center |
| IXLR | Intermediary Location Register (virtual HLR) |
| IXRS | Intermediary Receiving Station (virtual MSC) |
| IX-SC | Intermediary Service Center |
| IXTS | Intermediary Transmitting Station (GMSC) |
| MO | Message Origination - Originating in a GSM carrier and terminating into Intermediary network for delivery to any US carrier (GSM, TDMA, CDMA) |
| MS | Mobile Station |
| MSC | Mobile Switching Center |
| MT | Message Termination—Message terminating into a non-US carrier. |
| OPC | Originating Point Code |
| SME | Short Message Entity |
| SMSC | Short Message Service Center |
| SPC | Signaling Point Code |
| SSN | Sub-system Number used for identifying an application |

-continued

| STP | Signal Transfer Point |
| VGW-MSC | Virtual Gateway MSC |
| VLR | Visitor Location Register |

Figure 1:
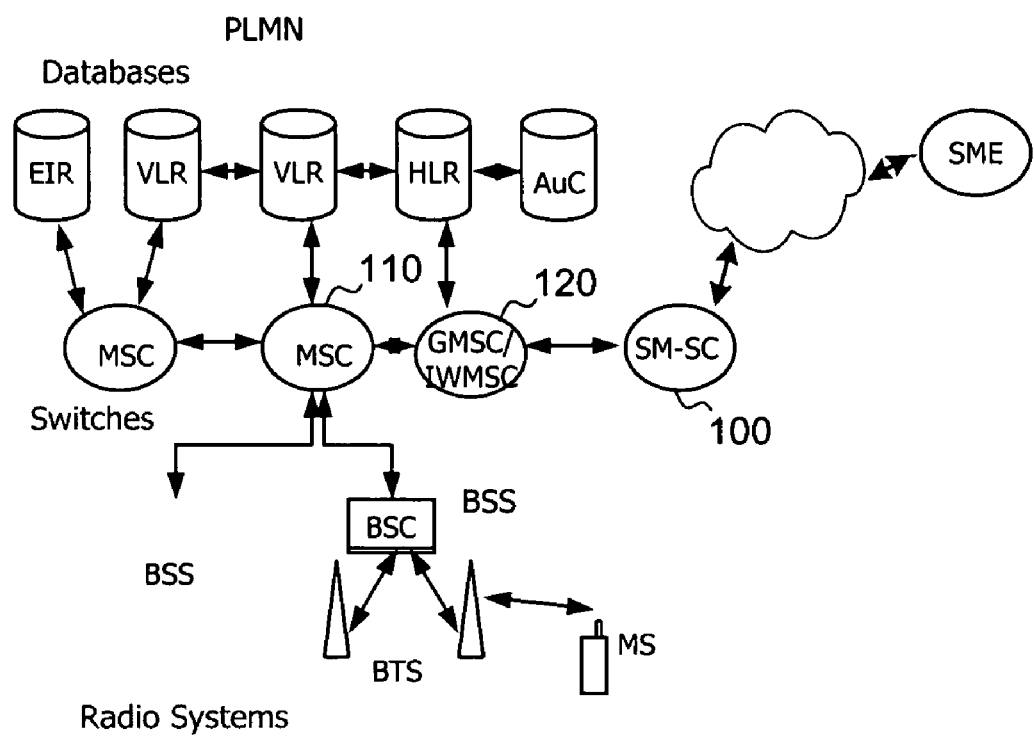
FIG. 1 shows a GSM Network element model for SMS messages in accordance with the prior art.

FIG. 1 shows a GSM Network element model for SMS messages. In accordance with well-known standards, all mobile originated messages from a network are routed to a "home" SMSC (Short Message Service Center) 100 through an Inter-working MSC network element 110. SMSC 100 then forwards the message to its destination, whether it is an application or another subscriber unit. Generally speaking, all Mobile Terminated messages are delivered through an MSC to a mobile station through a Gateway MSC unit 120. As per the GSM model, an SMSC is not necessarily a network element directly connected to an SS7 network, although in practice an SMSC is typically built with a GMSC component and, in fact, often is directly connected to an SS7 network. The other elements shown in FIG. 1 are well-known to those skilled in the art.

Figure 2:
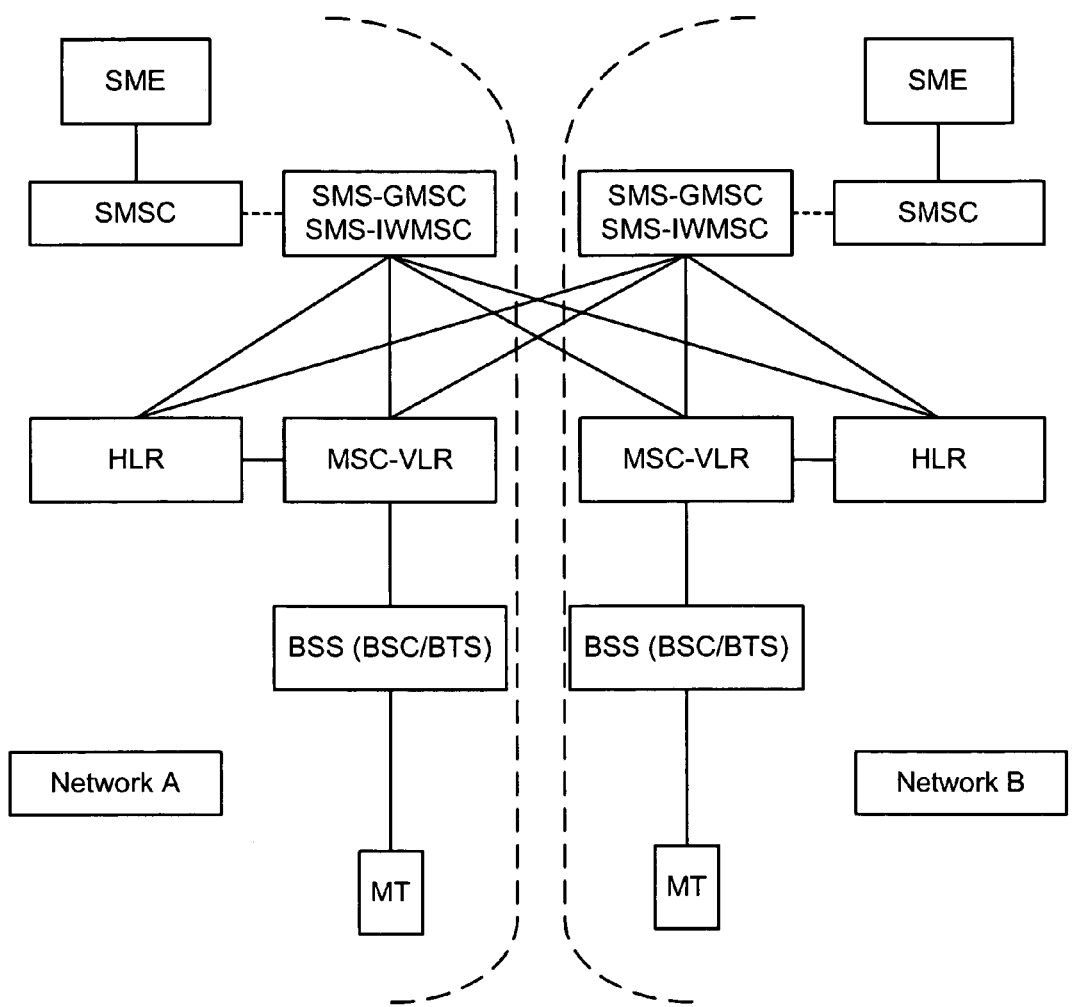
FIG. 2 shows inter-PLMN connectivity for GSM SMS message Delivery between two GSM networks in accordance with the prior art.

An Inter-PLMN GSM message exchange architecture is shown in FIG. 2. In this Figure, Network A can post SMS messages within its own network by querying its own HLR. The HLR then returns the appropriate MSC number and the SMSC through SMS-GMSC network element sends the SMS message to the appropriate MSC that is currently servicing the intended recipient the mobile subscriber.

For Inter-PLMN messages, the SMSC of Network A, for example, would access the HLR of Network B and obtain the MSC number (typically of Network B, if the mobile subscriber of Network B is not roaming) for posting messages directly to Network B's MSC. Such an interchange is supported to the extent that both Network A and Network B implement GSM signaling standards, particularly GSM MAP layer for SMS message.

Figure 3:
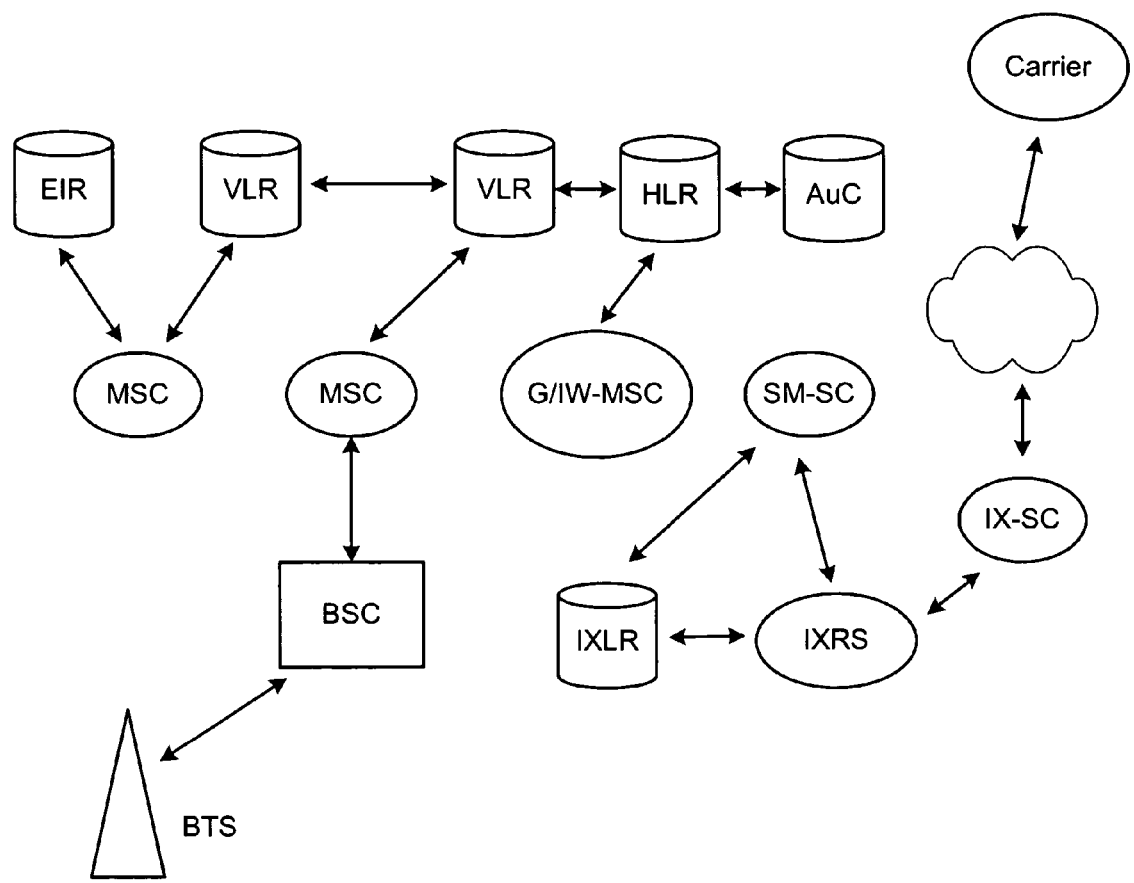
FIG. 3 shows a model to receive SMS messages from a GSM network by an Intermediary for further transmission to ANSI carriers in accordance with the present invention.

FIG. 3 shows a model to receive SMS messages from a GSM network by an Intermediary for further transmission to ANSI carriers, in accordance with the present invention. In this embodiment, the Intermediary (elements of which are identified by IXLR, IXRS and IX-SC) behaves like a GSM carrier for the purpose of receiving SMS message. When a subscriber originates a message in a GSM network, the SMS message is received, as usual, by the home SMSC. That home SMSC then initiates a Send Routing Information (SRI) query over the SS7 (or C7) network. If the intended recipient is serviced by an ANSI carrier, this SRI call usually fails because of incompatibility of GSM and ANSI SS7 networks. Under some circumstances, roaming messages may be exchanged between ANSI GSM and ITU GSM carriers, and substantially all other messages, including SMS messages, between ANSI TDMA/CDMA and ITU GSM carriers are blocked.

According to one embodiment, the present invention provides a routing table, called a Global Title Translation (GTT), which points all Send Routing Information messages destined for ANSI TDMA and CDMA networks towards a virtual carrier network employing a virtual HLR function (the IXLR in this case). The Virtual HLR is integrated with a set of databases and other routing information tables that identify all valid ANSI destinations to which the Intermediary is capable of sending SMS messages.

Figure 4:
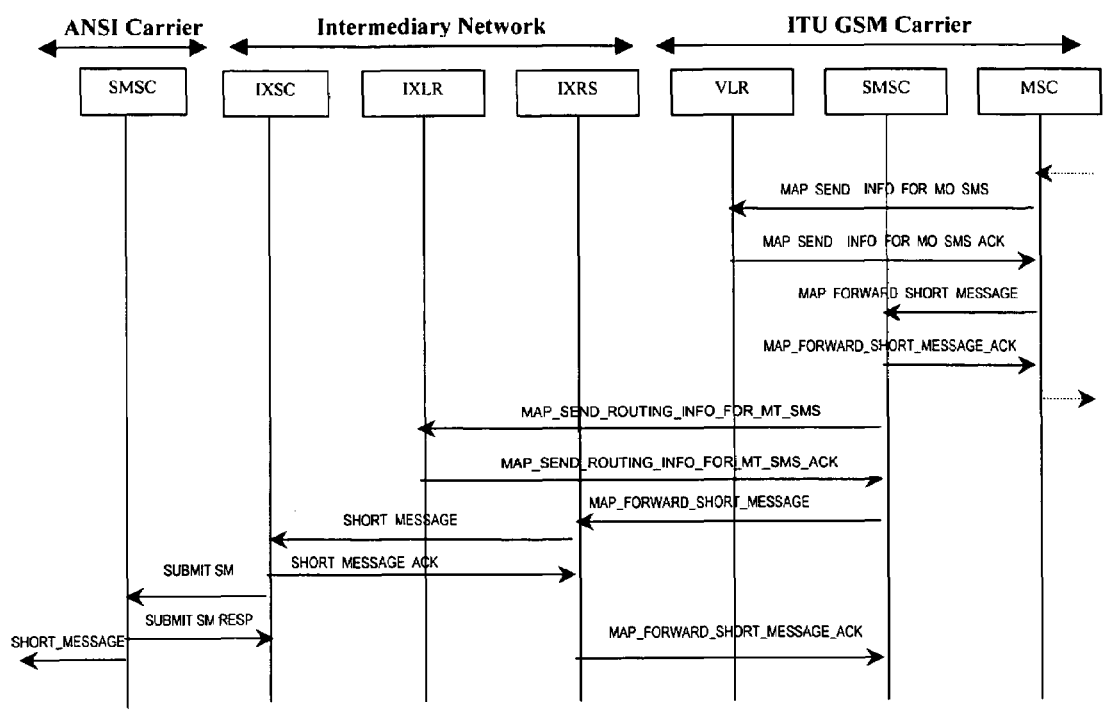
FIG. 4 shows a store and forward call flow control for an ITU GSM carrier to an ANSI carrier in accordance with the present invention.

Upon receipt of an SRI from an ITU GSM carrier, the Virtual Carrier Network's HLR (IXLR) responds with a SRI response with an ACK or appropriate error message depending upon whether the message is deliverable or not. Once the originating SMSC receives the SRI response back, the short message is sent to the Virtual Carrier's network (IXRS) using Forward Short Message (FSM). In a preferred embodiment, the GTT routing table resolves the FSM routing in such a way that the Intermediary receives the message at its Virtual Gateway MSC (IXSC). The IXSC may then forward the message to the destination carrier either through an IP protocol such as SMPP or through an SS7 link. A detailed call flow for sending an SMS message from an ITU GSM carrier to ANSI carrier is shown in FIG. 4. Explanations of several of the messaging commands and exchanges are provided below.

$MAP_{13}$ SEND_ROUTING_INFO_FOR_MT_SM:
Direction: SMSC→IXLR
CgPA: e.164SMSC.
CdPA: e.164MSISDN
SSN: HLR All MO messages are routed from the home SMSC. For messages destined for a US TDMA/CDMA carrier, the GSM SMSC performs a MAP SRI call on the Virtual HLR provided by the present invention, namely the IXLR. In one embodiment, the Virtual HLR preferably has an e.164HLR address which is the telephone number of a mobile phone (TDMA or CDMA) owned by virtual network provider. All MAP messages destined to a TDMA or CDMA carrier in the US are preferably sent to the virtual network provider's gateway by an entity such as Teleglobe. Those skilled in the art will appreciate that these message flow scenarios are exemplary only and are not meant to limit the scope of the present invention.

When a GSM SMSC sends a MAP SRI INFO message, the message is addressed to the subscriber's e.164 number (MSISDN). There may be one or more GTT actions performed in the home network's STP. This STP, after initial GTT activity, sends all +1 destined messages to Teleglobe's network (or ultimately to Teleglobe's network through an intermediary network). Teleglobe's STP then conducts a final GTT, that results in pointing such messages to DPC of the virtual network provider's (intermediary's) IXLR gateway. The SPC of IXLR is a "private" point code assigned by Teleglobe and the point code is known to the GTT database of Teleglobe's STP.

MAP_SEND_ROUTING_INFO_FOR_MT SMS_ACK:
Direction: IXLR→SMSC
CgPA: e.164IXLR
CdPA: e.164SMSC
SSN: MAP In accordance with the present invention, the IXLR sends back a MAP SRI ACK message with its own e.164 routing number. The CdPA is the e.164 address of SMSC from where the MAP SRI originated.

The IXLR sends the message to Teleglobe's STP. Teleglobe STP performs a GTT on the e.164 number of the SMSC. If Teleglobe's STP does not have the DPC of the SMSC, Teleglobe preferably forwards the message to an SPC of another STP. Final GTT translation by an STP forwards the message to the appropriate SMSC.

The ACK message contains an MSRN number that is the same as an encoded MSISDN number in e.164 format. This number is populated in the IMSI field. The IMSI field preferably contains a pseudo IMSI number used for several purposes including notification of the end carrier to the sending SMSC. More details regarding this and related features can be found in co-pending U.S. application Ser. No. 10/724,106, entitled "Virtual Carrier Addressing and Routing Techniques for Global SMS," which is incorporated herein by reference.

MAP_FORWARD_SHORT_MESSAGE
Direction: IXRS←SMSC
CgPA: e.164SMSC
CdPA: e.164MSRN (e.164MSISDN)
SSN: MSC The MSRN number (MSISDN number) returned by the MAP SRI ACK message is extracted and used by the SMSC to forward the short message. The called party address used is the MSRN number, the GTT of which should ultimately result in addressing the IXRS. Teleglobe's STP sends, during the final GTT stage, this message to the DPC of the IXRS.

MAP_FORWARD_SHORT_MESSAGE_ACK
Direction: IXRS→SMSC
CgPA: e.164IXRS
CdPA: e.164SMSC
SSN: MAP This message is transmitted from the IXRS (which acts as a virtual MSC for a home SMSC). The message is addressed to the e.164 address of SMSC and the GTT ensures that the message is received by the SMSC sending the SMS message.

SUBMIT SM
Direction: IXSC→Terminating SMSC

This message, part of a SMPP protocol suite, is used to send a message from the Intermediary SMSC to an ANSI carrier's SMSC for terminating the short message. The terminating carrier's SMSC, in turn, forwards the short message to the subscriber terminal.

It is noted that for an Intermediary SMSC, a number of protocols can be used to forward the short message to the terminating carrier's SMSC. These include SMPP, UCP, SMTP and a number of other IP based protocols. In addition, it is also possible to directly terminate the short message to the subscriber terminal using an SS7 link, in which case, the terminating carrier's SMSC is not involved in the call flow.

SUBMIT SM RESP
Direction Terminating SMSC→IXSC

This message is the response message received from the terminating carrier's SMSC acknowledging or rejecting a short message submitted using SUBMIT SM message.

Figure 5:
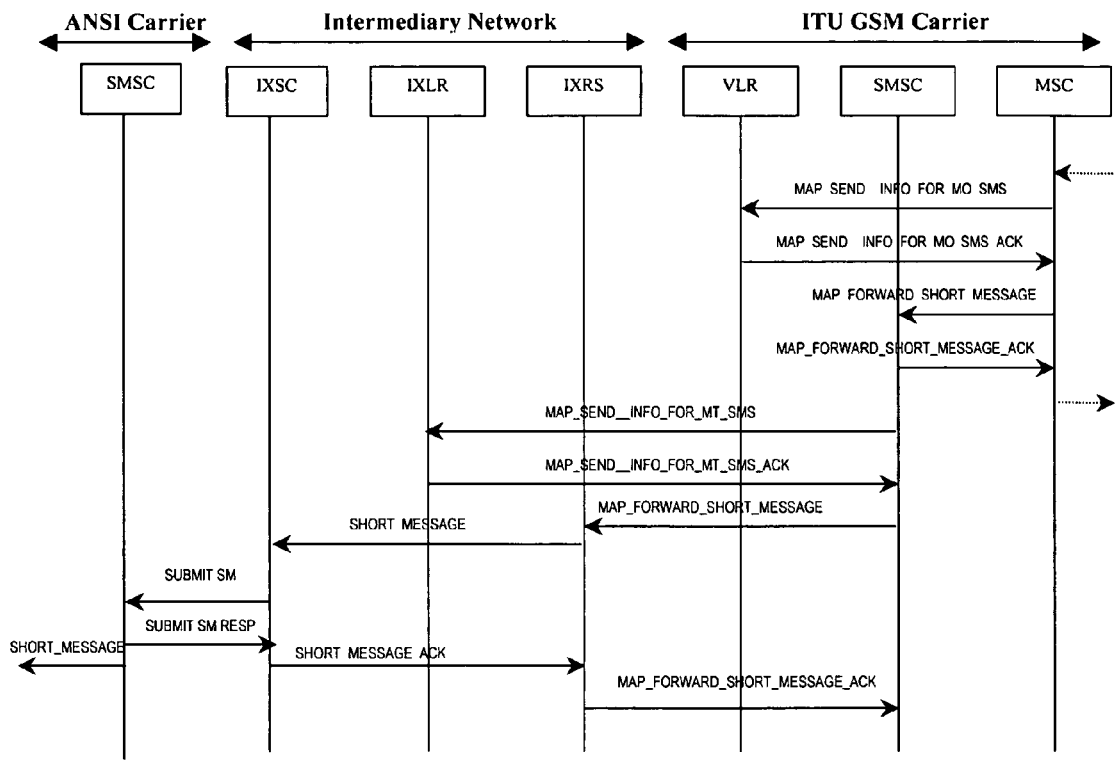
FIGS. 5 and 6 show alternative call flow control for an ITU GSM carrier to an ANSI carrier in accordance with the present invention.
Figure 6:
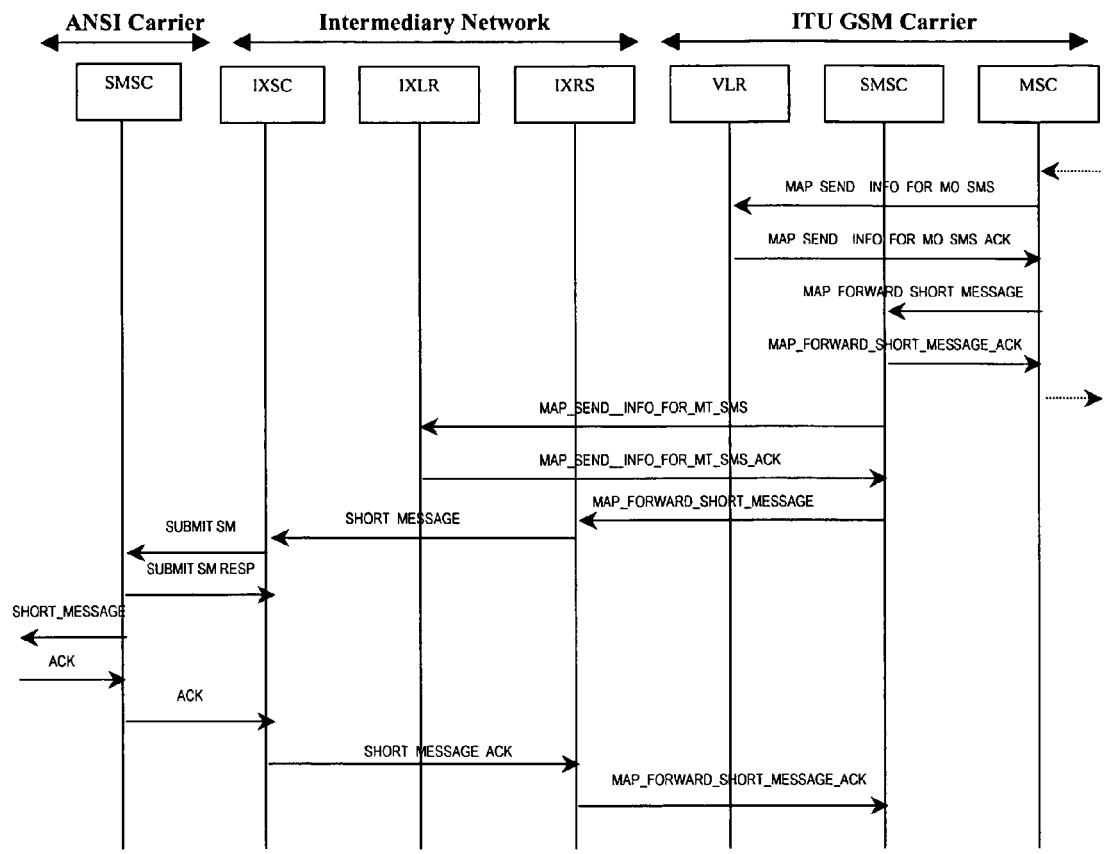

Alternative call flows for ITU GSM carrier to ANSI carrier messaging are shown in FIGS. 5 and 6. The mechanism depicted in FIG. 5 has the advantage of ensuring reliable delivery of an SMS message between a home and a destination carrier's SMSC. More specifically, FIG. 5 shows an alternate embodiment of the invention, wherein, Intermediary SMSC (IXSC) forwards the message to an ANSI destination carrier's SMSC and waits for acknowledgement before returning a Forward Short Message (FSM) acknowledgement to the originating GSM carrier's SMSC. This alternate mechanism has the advantage of ensuring reliable delivery of SMS message between home and destination carrier's SMSC.

FIG. 6 shows yet another alternate embodiment of invention, wherein the Intermediary SMSC (IXSC) forwards the message to an ANSI destination carrier's SMSC and waits for delivery receipt before returning a Forward Short Message acknowledgement to the originating GSM carrier's SMSC. This alternate mechanism has the advantage of ensuring reliable delivery of SMS message between a home SMSC and a destination mobile subscriber unit. However, the timeouts in this message sequence may be of concern in a practical implementation of this embodiment although this sequence can be made to work if the delivery receipt is received within the time out period of the original Forward Short Message from the home SMSC to the Intermediary network.

Figure 7:
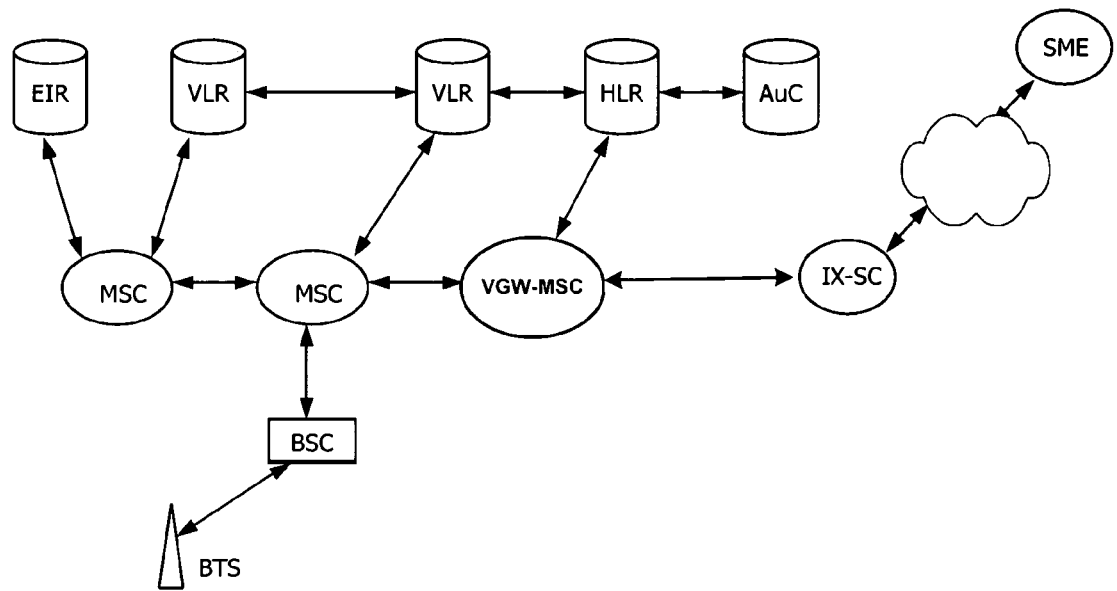
FIG. 7 shows a network model for terminating messages into a ITU GSM Carrier network from an Intermediary network represented by SME in accordance with the present invention.

FIG. 7 shows a network model, in accordance with the present invention, for terminating messages into an ITU GSM Carrier network from an Intermediary network represented by an SME (Short Message Entity) in the Figure. An SMS message from an ANSI carrier is received by the SME by one of several means that include SMSC to SME delivery via SMPP or other equivalent protocols, or via SS7 delivery. The received message is then transmitted to the SMSC node (IX-SC) in the Intermediary network.

Figure 8:
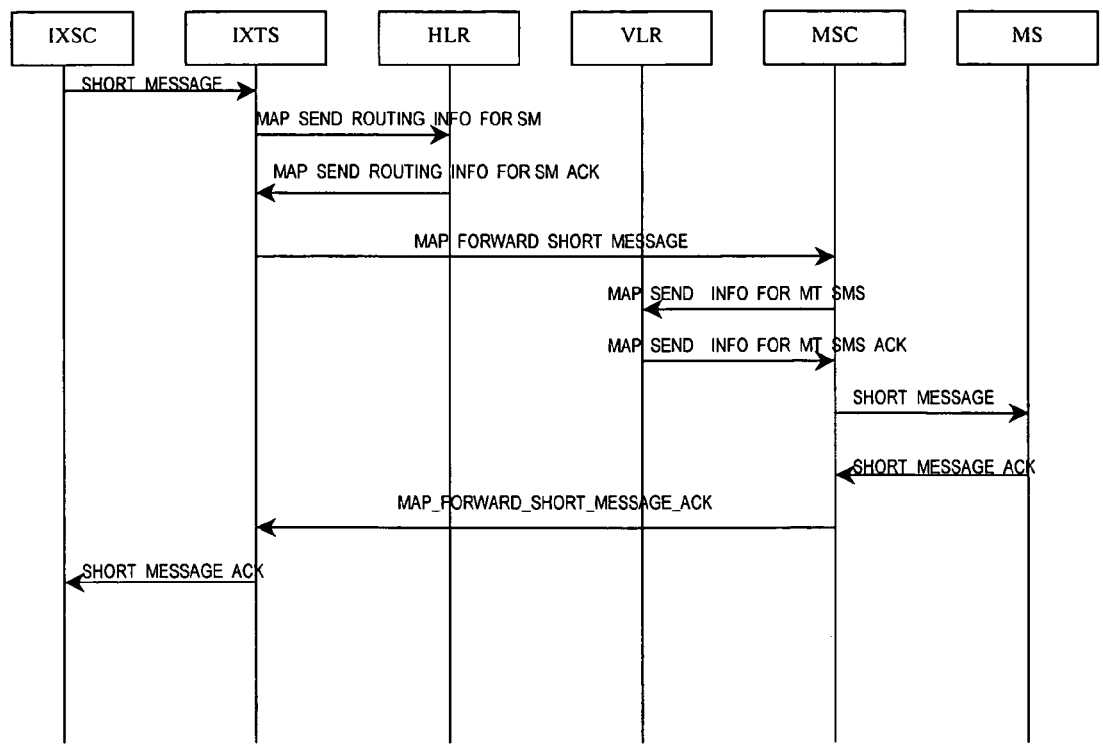
FIG. 8 shows call flow control for delivering a message to a GSM network in accordance with the present invention.

For the purpose of delivering the message to a GSM network, the Intermediary network implements a Virtual Gateway MSC (VGW-MSC) that is connected on one side to Intermediary SMSC (IX-SC) and on the other side to a C7 network. Upon receipt of an SMS message from an ANSI carrier's home network, the Virtual GW-MSC node performs GTT route lookup on the destination GSM carrier's HLR and forwards the short message to the appropriate switch (MSC) based on the address information received back from destination carrier's HLR. In doing these transactions, the Intermediary behaves exactly like a GSM carrier and performs all the functions required as part of roaming guidelines prescribed by GSM Associations IR 21 document. Call flows depicting these transaction are shown in FIG. 8. The role of the IXTS in this call flow emulates that of a GMSC as per GSM protocol standard.

MAP_SEND_ROUTING_INFO_FOR_SM:
Direction: IXTS→HLR
CgPA: e.164IXTS.
CdPA: e.164MSISDN
SSN: HLR For an MO message originated in the US and directed to a GSM carrier, GTT is preferably performed on the destination MSISDN number at Teleglobe STP. The GTT translation will most probably result in a DPC of an intermediary STP that will again perform GTT. There may be more than one STP during routing that performs GTT translations. The final GTT translation (most probably by an STP in the destination network) results in the DPC of the HLR and message being delivered to the HLR. Again, those skilled in the art will appreciate that the message flows described herein are exemplary only and not meant to limit the scope of the present invention.

MAP_SEND_ROUTING_INFO_FOR_SM ACK:
Direction: IXSC←HLR
CgPA: e.164HLR
CdPA: e.164IXTS
SSN: MAP The HLR sends back a MAP SRI ACK message with its own e.164 routing number (since this is inter-PLMN messaging, the HLR uses its own e.164 number to allow for GTT). The CdPA is the e.164 address of the IXSC that can be routed by Teleglobe. Before the message gets to Teleglobe, a far end STP GTT translation may be performed, which should result in all +1 messages delivered to Teleglobe. Teleglobe will then route the message to the Intermediary using final GTT translation.

MAP_FORWARD_SHORT_MESSAGE
Direction: IXTS→MSC
CgPA: e.164IXTS
CdPA: e.164MSRN
SSN: MSC The MSRN number returned by the MAP SRI ACK message is extracted and used by the IXTS to forward the short message. The called party address used is the MSRN number, the GTT of which should ultimately result in addressing the visited MSC.

MAP_FORWARD_SHORT_MESSAGE_ACK
Direction: IXTS←MSC
CgPA: e.164MSC (or e.64MSRN?)
CdPA: e.164IXTS
SSN: MAP This message is transmitted back from the visited MSC to the IXTS acting as virtual GMSC. The message is addressed to the e.164 address of the IXTS and the GTT path follows that of earlier reverse message flows reaching IXTS.

Figure 9:
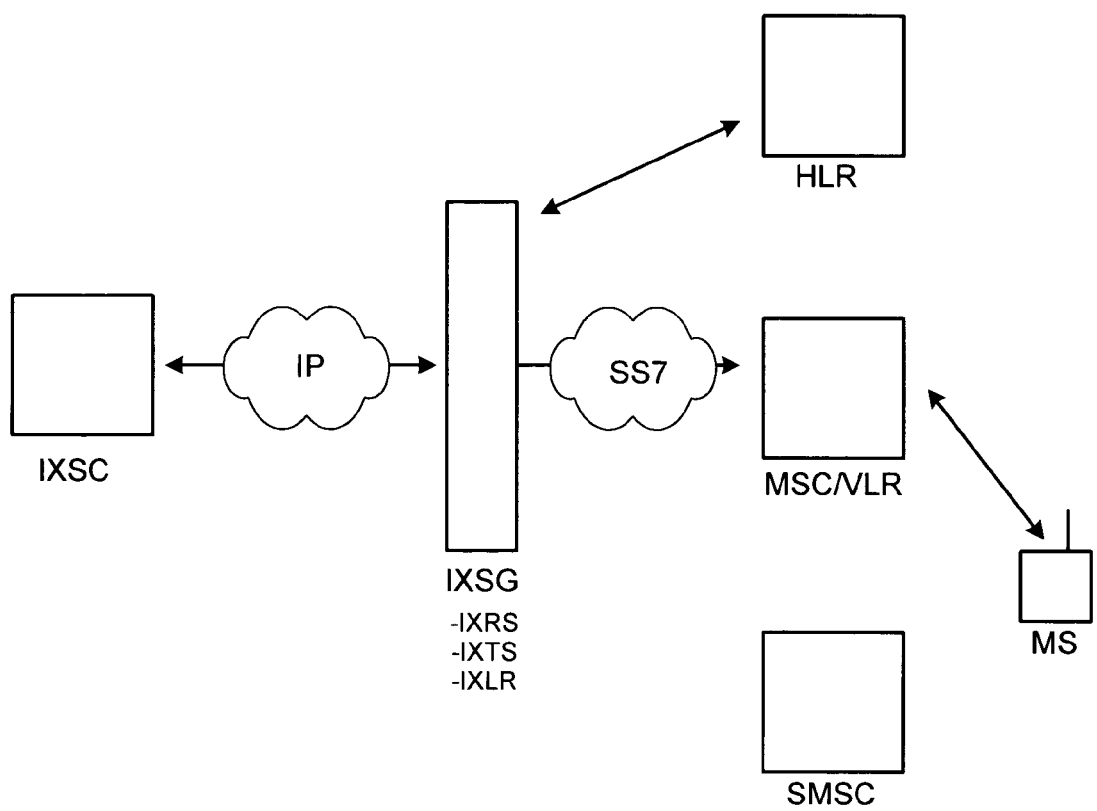
FIG. 9 shows a realization of a virtual network within an Intermediary network in accordance with the present invention.

FIG. 9 depicts an Intermediary Network System in accordance with the present invention. The Virtual Network in accordance with the present invention preferably comprises four major components, an IXSC, IXRS, 1XTS and IXLR, the latter three components being integrated in an IXSG—intermediary SMS gateway.

The IXSC is the intermediary service center, which controls the SS7 gateway functionality for sending and receiving SMS messages. The IXSC is a logical node supporting simplified service center functionality. This functionality preferably includes:

Accepting short messages from the intermediary acting as an SME.

Storing and forwarding short messages to the SS7 gateway.

Receiving short messages from the SS7 gateway.

Dispatching short messages to the intermediary

The IXRS is the intermediary Receiving Station, which emulates functionality of an MSC. This is a logical node part of the IXSG. This node is responsible for receiving SMS messages and alerting the IXSC. The node also implements MSC functionality for the purpose of receiving SMS short messages. Specifically, the IXRS receives the message and terminates the GSM SMS message. The IXRS also communicates with the IXSC to send received SMS messages.

The IXTS is the intermediary Transmitting Station, which emulates GMSC functionality. This is a logical node part of the IXSG. This node is responsible for sending SMS messages upon request from the IXSC.

The IXLR is the intermediary Location Register, which functions as a virtual HLR that is used for supporting routing requests from far side entities. This node is logical part of IXSG gateway and implements limited HLR functionality to support routing information for MO SMS message delivery. When an MO message is sent from a subscriber unit (SU), the home SMSC receives the message. The Home SMSC then queries the IXLR to get routing information. The SMSC then sends the message to IXRS node. In case of redundant nodes, the IXLR is preferably configured to have a single point code so that SMSCs "see" a single entity from which to obtain routing information.

e.164 numbering of SS7 nodes: The intermediary, as described herein, is not necessarily a full fledged carrier (and in the preferred implementation, is not) and therefore does not "own" any phone numbers. For GTT routing purpose, the intermediary preferably uses its existing landline or mobile phone numbers. Typically, landline phone numbers are preferable to make sure that there is no clash with mobile messaging.

GSM International Mobile Subscriber Identity (IMSI) Number Mapping: Since ANSI phone numbers do not have IMSI numbers, an encoded MSISDN number in e.164 format or pseudo IMSI numbers are allocated out of a pool within the Intermediary network, in accordance with the present invention. An IMSI number thus coded is routable using GTT for facilitating message routing from an ITU GSM carrier to an intermediary simulating GSM interfaces using pseudo IMSI numbers. Reference can again be made to co-pending U.S. application Ser. No. 10/724,106, which is incorporated herein by reference.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for exchanging a short message service (SMS) message between networks operating in accordance with different standards, comprising:

an intermediary network system connected simultaneously to a first network operating in accordance with a first standard and a second network operating in accordance with a second standard, the intermediary comprising an intermediary gateway providing an SS7 interface on one side thereof and an IP interface on another side thereof, the intermediary gateway being in communication with a home location register (HLR), mobile switching center/visitor location register (MSC/VLR) and short message service center (SMSC) of the second network; the intermediary gateway comprising an intermediary Location Register, an intermediary Transmitting Station, and an intermediary Receiving Station, each of which substantially emulate, respectively, HLR functionality, GSM SMSC functionality and MSC functionality, wherein the GSM SMSC functionality comprises sending appropriately timed acknowledgement messages to a GSM-compliant network when the SMS message is being exchanged with an ANSI-compliant network.

2. The system of claim 1, wherein an acknowledgement of receipt to the first network is sent only after a response from the second network is received at the intermediary network system.

3. The system of claim 1, wherein an acknowledgement of receipt to the first network is sent only after an acknowledgement of receipt of the SMS message is received from the second network at the intermediary network system.

4. The system of claim 1, wherein the intermediary is operable to send a MAP Send Routing Information for MT SMS messages in accordance with GSM standards.

5. The system of claim 1, further comprising means for performing a GTT look up to determine to which mobile switching center the SMS message should be sent.

6. The system of claim 5, wherein when the SMS message is directed to a mobile station (MS) operating in the second network, the SMS message is routed to the intermediary system.

7. The system of claim 1, wherein the intermediary operates, from the perspective of the first network, as a Mobile Switching Center (MSC), in accordance with the same standards as the standards of the first network.

8. The system of claim 1, wherein the intermediary operates, from the perspective of the second network, as a Mobile Switching Center (MSC), in accordance with the same standards as the standards of the second network.

* * * * *

UNITED STATES PATENT AND TRADEMARK OFFICE
CERTIFICATE OF CORRECTION

PATENT NO. : 7,013,156 B2 Page 1 of 1
DATED : March 14, 2006
INVENTOR(S) : Mark R. Smith, Paul R. Ruppert and Robert C. Lovell, Jr.

It is certified that error appears in the above-identified patent and that said Letters Patent is hereby corrected as shown below:

<u>Column 4,</u>
Line 13, change "$MAP_{13}SEND$" to -- MAP_SEND --.

Signed and Sealed this

Thirtieth Day of May, 2006

JON W. DUDAS
*Director of the United States Patent and Trademark Office*